(12) United States Patent
Liu

(10) Patent No.: US 7,742,275 B2
(45) Date of Patent: Jun. 22, 2010

(54) MEMS CAPACITOR WITH CONDUCTIVELY TETHERED MOVEABLE CAPACITOR PLATE

(75) Inventor: Lianjun Liu, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 294 days.

(21) Appl. No.: 11/848,521

(22) Filed: Aug. 31, 2007

(65) Prior Publication Data
US 2009/0059465 A1   Mar. 5, 2009

(51) Int. Cl.
H01G 5/00 (2006.01)
H01G 7/00 (2006.01)
(52) U.S. Cl. ...................... 361/277; 361/290
(58) Field of Classification Search ......... 361/277–281, 361/290
See application file for complete search history.

(56) References Cited

U.S. PATENT DOCUMENTS 6,507,475 B1   1/2003  Sun
7,151,425 B2   12/2006 Park et al.
2005/0156694 A1  7/2005 Park et al.
2007/0025050 A1 * 2/2007 Shimanouchi et al. ...... 361/277
2007/0094864 A1  5/2007 Park et al.

FOREIGN PATENT DOCUMENTS

WO   WO 2005117042 A1 * 12/2005

OTHER PUBLICATIONS

Lee, Hee-Chui et al.: "Design, fabrication and RF performances of two different types of piezoelectrically actuated Ohmic MEMS switches"; Journal of Micromechanics and Microengineering; 2005; pp. 2098-2104; Institute of Physics Publishing; UK.

* cited by examiner

Primary Examiner—Eric Thomas

(57) ABSTRACT

A capacitive device including at least one actuator structure formed on a substrate is provided. The capacitive device further includes a moveable structure formed on the substrate and mechanically coupled to the at least one actuator structure. The moveable structure includes a moveable capacitive plate and a bridge, formed substantially planar to the moveable capacitive plate. The bridge is used to mechanically and electrically couple the moveable capacitive plate to a signal line formed on the substrate such that the moveable capacitive plate moves up or down based on a force generated by the at least one actuator structure.

17 Claims, 2 Drawing Sheets

US 7,742,275 B2

MEMS CAPACITOR WITH CONDUCTIVELY TETHERED MOVEABLE CAPACITOR PLATE

BACKGROUND

1. Field

This disclosure relates generally to MEMs devices, and more specifically, to a MEMs capacitor device with a conductively tethered moveable capacitor plate.

2. Related Art

A MEMS capacitor is one of the most important tunable devices required by re-configurable radio-frequency (RF) systems. In a piezoelectrically actuated MEMS capacitor device, the mechanical formation is predominantly determined by the requirements of the actuator design, the mechanical formation including material choices, thicknesses and stresses of the thin film layers of the moveable structures. As a result, this makes it very difficult to use the same material composites to design a good quality moveable MEMS capacitor plate that meets its own corresponding mechanical, thermal and electrical/RF requirements.

For improved RF performance, a transmission line for use in connecting the moveable MEMS capacitor plate to another part of the RF circuit will most likely require a different metal material and thickness than corresponding ones of the piezoelectric actuator electrodes. This makes it difficult to design a moveable connection structure that has minimum impact to the thermal mechanical performance of the overall device. At the same time, an electrically isolated (i.e., electrically "floating") capacitor plate design significantly reduces the capacitance density of the MEMS capacitor.

Accordingly, there is a need for an improved method and apparatus for overcoming the problems in the art as discussed above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
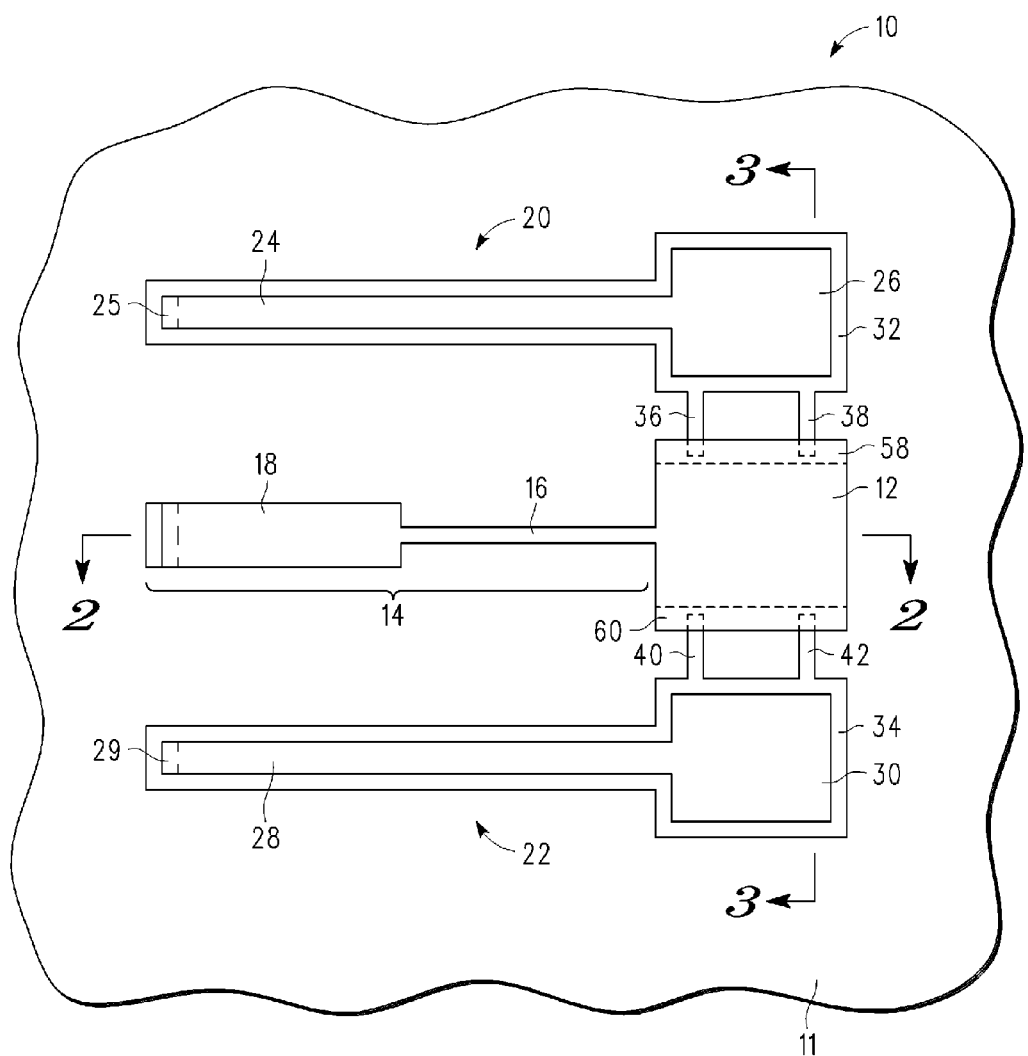
FIG. 1 is a top down view of a portion of a piezoelectric MEMS capacitor according to one embodiment of the present disclosure.

FIG. 1 is a top down view of a portion of a piezoelectric MEMS capacitor or capacitive device 10 according to one embodiment of the present disclosure. The piezoelectric MEMS capacitor 10 includes a moveable capacitor plate 12 with an integral RF connection "soft" bridge 14. The material composition and dimensions of the moveable capacitor plate 12 are selected according to the capacitance value requirements of a given MEMS capacitor and re-configurable RF front-end application or implementation. In one embodiment, the moveable capacitor plate 12 and the integral RF connection "soft" bridge 14 comprise metal only conductive material that is formed and patterned at the same time. The integral RF connection "soft" bridge 14 mechanically and electrically couples (i.e., tethers) the MEMS capacitor moveable electrode 12 to a fixed (i.e., stationary) RF circuit input/output (I/O) node, by way of either an RF In node or an RF Out node, to be discussed further herein below. In addition, as used herein, the term "soft" bridge refers to a spring-like feature in which the mechanical stiffness of the spring-like feature is on the order of less than ten percent (10%) of the overall stiffness of the structure. Accordingly, bridge 14 operates as a conductive tether between an anchor point of the bridge and the moveable capacitor plate 12. In other words, the "soft" bridge does not contribute much mechanically in terms of stiffness to the overall mechanical structure. Furthermore, the integral RF connection bridge 14 advantageously enables the RF connection design to be independent from a mechanical actuator connection design of the MEMS capacitor 10.

The integral RF connection "soft" bridge 14 includes a first portion 16 and a second portion 18. The first portion 16 is coupled between the moveable capacitor plate 12 and the second portion 18. Stated another way, the first portion 16 of bridge 14 is proximate the moveable capacitor plate 12. The second portion 18 is distal from the moveable capacitor plate 12 and couples to one of a fixed RF input I/O node and a fixed RF output I/O node, to be discussed further herein below. The first portion 16 and the second portion 18 are each characterized by corresponding length, width and thickness dimensions. In one embodiment, the width dimension of the first portion 16 and the width dimension of the second portion 18 are different, wherein the width dimension of the first portion 16 is smaller than the width dimension of the second portion 18, such as illustrated in FIG. 1. In another embodiment, the width dimension of the first portion 16 and the width dimension of the second portion 18 are the same, wherein the width dimension of the first portion 16 is substantially equal to the width dimension of the second portion 18. Furthermore, the thickness of the first portion 16 and the second portion 18 is substantially the same as a thickness of the moveable capacitor plate 12 as illustrated in the cross-sectional view of FIG. 2, wherein the thickness of the moveable capacitor plate 12 is determined according to the requirements of a given re-configurable RF front-end application or implementation. Additional discussion of bridge 14 is presented herein below with reference to FIG. 2.

Referring back to FIG. 1, the piezoelectric MEMS capacitor 10 also includes first and second capacitor actuators or actuator structures that are generally indicated by reference numerals 20 and 22. In one embodiment, capacitor 10 includes at least one actuator structure. The first and second capacitor actuators 20 and 22 are configured for being actuated between a first position and a second position in response to corresponding actuation signals or energies, to be discussed further herein below with reference to FIG. 3. In one embodiment, the first and second capacitor actuators each include a piezoelectric portion and an electrostatic portion. For the first capacitor actuator 20, the piezoelectric portion is indicated by reference numeral 24 and the electrostatic portion is indicated by reference numeral 26. For the second capacitor actuator 22, the piezoelectric portion is indicated by reference numeral 28 and the electrostatic portion is indicated by reference numeral 30. In a vertical direction, the piezoelectric portions (24,28) each include a lower electrode layer (shown), a piezoelectric material layer (PZT) (not shown), and an upper electrode layer (not shown). In one embodiment, the lower electrode material layer is common between the piezoelectric portion (24,28) and the electrostatic portion (26, 30) of each capacitor actuator (20,22), respectively, wherein the material comprises platinum (Pt). In addition, the ends of the piezoelectric portions 24 and 28 that are distal from the corresponding electrostatic portions 26 and 30, respectively, are anchored to substrate 11, as indicated by the dashed lines and reference numerals 25 and 29, respectively.

First and second capacitor actuators 20 and 22 also overlie corresponding mechanical support features 32 and 34, respectively. Mechanical support features 32 and 34 comprise any suitable dielectric, for example, silicon nitride (SiN). Mechanical support feature 32 further includes support tabs 36 and 38, wherein a distal end of each support tab provides a lifting up/down support for a corresponding overlying portion of the capacitor plate 12. Similarly, mechanical support feature 34 further includes support tabs 40 and 42, wherein a distal end of each support tab provides a lifting up/down support for a corresponding overlying portion of the capacitor plate 12. In another embodiment, support tabs 36 and 38 can be replaced by a single support tab or can alternatively include more than two support tabs. Similarly, support tabs 40 and 42 can be replaced by a single support tab or can alternatively include more than two support tabs. In a preferred embodiment, the support tabs extend underneath the moveable capacitor plate by an amount sufficient to enable desired movement of the capacitor plate up and down by the actuator structures. In addition, while the support tabs may be configured to extend completely across the underside of the moveable capacitor plate, it is not most desirable.

Figure 2:
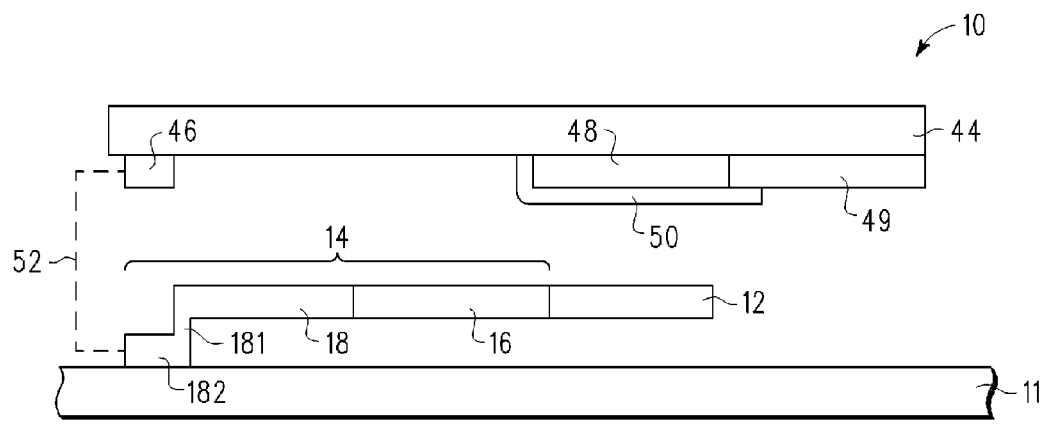
FIG. 2 is a cross-sectional view of the piezoelectric MEMS capacitor of FIG. 1 taken along line 2-2.

FIG. 2 is a cross-sectional view of the piezoelectric MEMS capacitor 10 of FIG. 1 taken along line 2-2. A second substrate 44 forms a portion of the capacitor structure 10. Various features are disposed upon the lower surface of substrate 44 as illustrated, wherein the features are initially formed upon the corresponding surface and then the substrate 44 is joined to the first substrate 11, using suitable bonding techniques known in the art. In particular, the various features include a conductor or metal trace 46, a second capacitor plate 48, a second conductor or metal trace 49, and electrostatic actuator plates 54 and 56 (the later of which are not shown in FIG. 2, but will be discussed further with reference to FIG. 3). Note that the second capacitor plate 48 comprises a fixed capacitor plate in comparison to moveable capacitor plate 12. The material composition and dimensions of the second capacitor plate 48 are selected according to the capacitance value requirements of a given MEMS capacitor and re-configurable RF front-end application or implementation. In addition, the second capacitor plate 48 and the second conductor 49 are conductively coupled to one another. In one embodiment, the second capacitor plate 48 and the second conductor 49 comprise the same conductive material, for example, a metal. Furthermore, in one embodiment, the first conductor 46 and the second conductor 49 represent an RF In connection (or node) and an RF Out connection (or node), respectively, of an RF circuit (not shown).

Referring still to FIG. 2, a suitable dielectric or dielectric stack 50 is formed overlying at least a portion of a surface of the second capacitor plate 48 and the surface of the second substrate 44. The coverage and material composition of dielectric 50 overlying the second capacitor plate 48 and second substrate 44 comprises at least a minimum sufficient coverage and material composition to produce a desired value of capacitance of MEMS capacitor 10 in response to the capacitor plate 12 being in a capacitor closed position. In operation, capacitor plate 12 moves (via actuation of actuator structures 20 and 22 of FIG. 1) from a capacitor open position to a capacitor closed position (as will be discussed further herein below with reference to FIG. 3).

In addition, the second portion 18 of the integral RF connection "soft" bridge 14 includes a conductive via portion 181 and a further portion 182, wherein the further portion 182 comprises a conductive pad, conductive trace, or portion of a conductive pad. Conductive pad 182 is electrically coupled to RF In conductor 46, wherein the electrical coupling is represented by dashed line 52. In other words, coupling of the first substrate 11 to the second substrate 44 includes electrically coupling of the RF In connection 46 to the integral RF connection "soft" bridge 14 through the conductive pad 182, further as indicated by dashed line 52.

As discussed above, the term "soft" bridge refers to a spring wherein the mechanical stiffness of the spring is on the order of less than ten percent (10%) of the overall stiffness of the structure. Accordingly, for a given metal, wherein the thickness dimension of the first portion 16 and second portion 18 comprises substantially the same thickness as a thickness dimension of the moveable capacitor plate 12, the length and width dimensions of the first portion 16 and the second portion 18 are selected to attain a resultant mechanical stiffness of the "soft" bridge 14 to be on the order of less than ten percent (10%) of the overall stiffness of the structure. As used herein, the overall stiffness of the structure is primarily determined by a stiffness of the first and second actuators 20 and 22, and by a stiffness of the moveable capacitor plate 12. Furthermore, in one embodiment, the width dimension of the first portion 16 and the width dimension of the second portion 18 are different, wherein the width dimension of the first portion 16 is smaller than the width dimension of the second portion 18, such as illustrated in FIG. 1. In another embodiment, the width dimension of the first portion 16 and the width dimension of the second portion 18 are the same, wherein the width dimension of the first portion 16 is substantially equal to the width dimension of the second portion 18.

Figure 3:
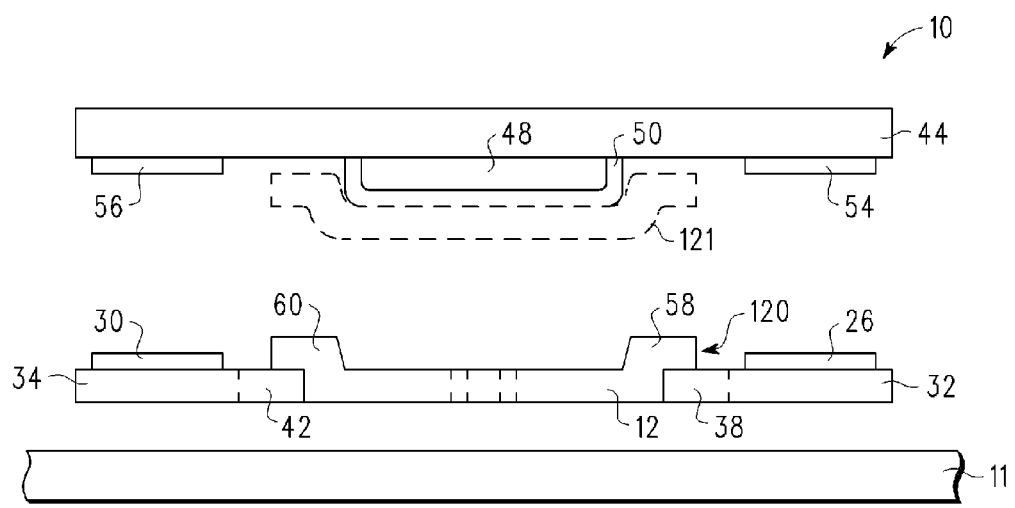
FIG. 3 is a cross-sectional view of the piezoelectric MEMS capacitor of FIG. 1 taken along line 3-3.

FIG. 3 is a cross-sectional view of the piezoelectric MEMS capacitor 10 of FIG. 1 taken along line 3-3. As illustrated, the second substrate 44 overlies the first substrate 11. The actuator structures 20 and 22 are cantilevered over the first substrate, wherein the illustration of FIG. 3 illustrates the ends of the electrostatic actuator portions 26 and 30. The opposite ends of the actuator structures 20 and 22 are anchored to the substrate 11; however, the anchoring of the opposite ends would be behind the plane of the drawing and is not illustrated in FIG. 3 in order to keep the illustration uncluttered. Similarly, the bridge 14 couples to a side of the moveable capacitor plate 12 which would be behind the plane of the drawing and is partially illustrated in FIG. 3 by dashed lines within a center portion of the moveable capacitor plate 12; however, the via 181 and conductor pad 182 of bridge 14 are not illustrated in order to keep the illustration uncluttered.

Referring still to FIG. 3, and as indicated earlier in the discussion of FIG. 2, substrate 44 further includes electrostatic actuator plates 54 and 56. Electrostatic actuator plates 54 and 56 are fixed, whereas, electrostatic actuator portions 26 and 30 are moveable (i.e., can move with respect to the fixed plates). Responsive to a suitable actuation signal or signals, the actuator structures 20 and 22 actuate the moveable capacitor plate 12 from a first position indicated by reference numeral 120 to a second position, indicated by a dashed line and reference numeral 121. Actuation of the actuator structures 20 and 22 can include actuation of one or the other of the piezoelectric and electrostatic portions of the corresponding actuator structures, or a combination of both. For example, actuation of the piezoelectric portions can be used in providing a first part of the actuation and actuation of the electrostatic portions can be used for providing a second part of the actuation. Other actuation implementations are also possible, according to the requirements of a given capacitive MEMS device application.

In one embodiment, moveable capacitor plate 12 includes edge support features 58 and 60. The capacitor plate edge support features 58 and 60 comprise features which overlay portions of the corresponding support tabs 38 and 42, respectively. The region of the moveable capacitor plate 12 that extends between the edge support features 58 and 60 comprises an active capacitor region of the moveable capacitor plate. The active capacitor region of the moveable capacitor plate 12 is that portion of the moveable capacitor plate which has greatest influence on the desired capacitance value attained by the MEMs capacitor in response to the MEMs capacitor being in the closed capacitor position. In other words, the edge support feature portions of the moveable capacitor plate are formed in a manner such that the resultant edge support features have minimal effect on the resultant capacitance value of the MEMs capacitor when the MEMs capacitor is in the closed capacitor position. When in the closed capacitor position (as indicated by reference numeral 121 of FIG. 3), the active capacitor region of moveable capacitor plate 12 is substantially in alignment with the fixed capacitor plate 48 of the second substrate 44, with dielectric 50 disposed between the two capacitor plates. In addition, in response to the capacitor 10 being in the closed capacitor position 121, not only is the desired capacitance value is attained, but an RF connection is established between RF In and RF Out by way of the RF connection "soft" bridge 14.

The MEMs capacitor and method of making the MEMs capacitor according to one embodiment of the present disclosure includes a design and method of making a MEMS capacitor with piezoelectric actuators. Such a MEMs capacitor device advantageously provides for improved thermal, mechanical, and RF performance in a MEMs capacitor structure. In addition, the MEMs capacitor embodiments of the present disclosure advantageously provide for a low voltage MEMS integrated passive device (MEMS/IPD) integration technology for re-configurable RF front-end applications in radio products. MEMS components can include MEMS switches and capacitors. In addition, PZT based actuators are used for low voltage operation, for example, in the range of 3-5V.

The substrates, as discussed herein, can comprise any semiconductor material or combinations of materials, such as gallium arsenide, gallium nitride, silicon germanium, silicon-on-insulator (SOI), silicon, monocrystalline silicon, glass, ceramic, the like, and combinations of the above.

In one embodiment, the MEMs capacitor device includes the use of a metal only electrical connection feature for the piezoelectrically actuated moveable MEMS capacitor electrode. This metal only electrical connection feature and moveable MEMS capacitor electrode are physically connected to but electrically isolated from the piezoelectric actuator through a dielectric film support. Accordingly, this allows the more independent thermal, mechanical and electrical design of the capacitor structure from that of the actuators.

In addition, the RF only connection between the MEMS moveable capacitor electrode/plate to the other fixed capacitor electrode/plate connection of the RF circuit is accomplished with use of a "soft" metal only moveable bridge. In one embodiment, the metal of the bridge comprises the same material as that of the moveable capacitor electrode. Accordingly, this enables the independent design of the RF connection from that of the actuators. The design of the bridge is that its mechanical stiffness is <10% of a corresponding mechanical stiffness of the actuators. Furthermore, the embodiment reduces the thermal mechanical impact of the connection line on the moveable capacitor plate and also allows one to double the capacitance density as compared to a "floating" MEMS capacitor electrode design.

By now it should be appreciated that there has been provided a capacitive device comprising at least one actuator structure formed on a substrate and a moveable structure formed on the substrate and mechanically coupled to the at least one actuator structure. The moveable structure includes a moveable capacitive plate and a bridge substantially planar to the moveable capacitive plate. The bridge is used to mechanically and electrically couple the moveable capacitive plate to a signal line formed on the substrate such that the moveable capacitive plate moves up or down based on a force generated by the at least one actuator structure. In addition, the at least one actuator structure can comprise, for example, a piezoelectric actuator structure and an electrostatic actuator structure. Furthermore, the moveable capacitive plate and the bridge are formed using a conductive material only.

In another embodiment, a capacitance is formed between the moveable capacitive plate and a fixed capacitive plate formed on the substrate. The capacitance formed between the moveable capacitive plate and the fixed capacitive plate formed on the substrate is a function of a distance between the moveable capacitive plate and the fixed capacitive plate formed on the substrate. In another embodiment, the moveable capacitive plate is mechanically coupled to the at least one actuator structure using a non-conductive connective structure. The non-conductive connective structure comprises at least one support tab. The moveable capacitive plate is also electrically isolated from the at least one actuator structure.

A capacitive device comprises at least one actuator structure formed on a first substrate and a moveable structure formed in the first substrate and mechanically coupled to the at least one actuator structure. The moveable structure includes a moveable capacitive plate and a bridge. The moveable capacitive plate is formed using a conductive material only. The bridge, substantially parallel to the moveable capacitive plate, is formed using the conductive material only, wherein the bridge is used to mechanically and electrically couple the moveable capacitive plate to a signal line formed on the first substrate such that the moveable capacitive plate moves up or down based on a force generated by the at least one actuator structure.

In one embodiment, a capacitance is formed between the moveable capacitive plate and a fixed capacitive plate formed on a second substrate. The capacitance formed between the moveable capacitive plate and the fixed capacitive plate formed on the second substrate is a function of a distance between the moveable capacitive plate and the fixed capacitive plate formed on the second substrate.

In another embodiment, the moveable capacitive plate is mechanically coupled to the at least one actuator structure using a non-conductive connective structure. The non-conductive connective structure comprises at least one support tab.

In one embodiment, a capacitive device comprises first and second actuator structures and a moveable structure. The first actuator structure is formed on a first substrate, wherein the first actuator structure comprises a piezoelectric actuator structure and an electrostatic actuator structure. The second actuator structure is formed on the first substrate, wherein the second actuator structure comprises a piezoelectric actuator structure and an electrostatic actuator structure. In addition, the moveable structure is formed on the first substrate and mechanically coupled to both the first actuator structure and the second actuator structure, wherein the moveable structure comprises a moveable capacitive plate formed using a conductive material only, and a bridge, substantially planar to the moveable capacitive plate, formed using the conductive material only. The bridge mechanically and electrically couples (i.e., tethers) the moveable capacitive plate to a signal line formed on the first substrate such that the moveable capacitive plate moves up or down based on forces generated by the first actuator structure and the second actuator structure.

In one embodiment, a capacitance is formed between the moveable capacitive plate and a fixed capacitive plate formed on a second substrate. The capacitance formed between the moveable capacitive plate and the fixed capacitive plate formed on the second substrate is a function of a distance between the moveable capacitive plate and the fixed capacitive plate formed on the second substrate. In another embodiment, the moveable capacitive plate is mechanically coupled to the first actuator structure using a first non-conductive connective structure and wherein the moveable capacitive plate is coupled to the second actuator structure using a second non-conductive connective structure. In another embodiment, the first non-conductive connective structure comprises at least one support tab and the second non-conductive connective structure comprises at least one support tab. In yet another embodiment, the moveable structure is electrically isolated from both the first actuator structure and the second actuator structure.

Because the apparatus implementing the present invention is, for the most part, composed of MEMS components known to those skilled in the art, MEMS details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. For example, the embodiments of the present disclosure can be applied to many generations of piezoelectric MEMs based devices. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A capacitive device comprising:
   at least one actuator structure formed on a substrate;
   a fixed capacitance plate formed on the substrate; and
   a moveable structure formed on the substrate and mechanically coupled to the at least one actuator structure, the moveable structure comprising:
   a moveable capacitive plate, wherein a capacitance is formed between the moveable capacitive plate and the fixed capacitive plate, and
   a bridge, substantially planar to the moveable capacitive plate, wherein the bridge is used to mechanically and electrically couple the moveable capacitive plate to a signal line formed on the substrate such that the moveable capacitive plate moves up or down based on a force generated by the at least one actuator structure.

2. The capacitive device of claim 1, wherein the capacitance formed between the moveable capacitive plate and the fixed capacitive plate formed on the substrate is a function of a distance between the moveable capacitive plate and the fixed capacitive plate formed on the substrate.

3. The capacitive device of claim 1, wherein the moveable capacitive plate is mechanically coupled to the at least one actuator structure using a non-conductive connective structure.

4. The capacitive device of claim 3, wherein the non-conductive connective structure comprises at least one support tab.

5. The capacitive device of claim 1, wherein the moveable capacitive plate is electrically isolated from the at least one actuator structure.

6. The capacitive device of claim 1, wherein the at least one actuator structure comprises a piezoelectric actuator structure and an electrostatic actuator structure.

7. The capacitive device of claim 1, wherein the moveable capacitive plate is formed using a conductive material only.

8. The capacitive device of claim 7, wherein the bridge is formed using the conductive material only.

9. A capacitive device comprising:
   at least one actuator structure formed on a first substrate; and
   a moveable structure formed in the first substrate and mechanically coupled to the at least one actuator structure, the moveable structure comprising:
   a moveable capacitive plate formed using a conductive material only, wherein a capacitance is formed between the moveable capacitive plate and a fixed capacitive plate formed on a second substrate; and
   a bridge, substantially parallel to the moveable capacitive plate, formed using the conductive material only, wherein the bridge is used to mechanically and electrically couple the moveable capacitive plate to a signal line formed on the first substrate such that the moveable capacitive plate moves up or down based on a force generated by the at least one actuator structure.

10. The capacitive device of claim 9, wherein the capacitance formed between the moveable capacitive plate and the fixed capacitive plate formed on the second substrate is a function of a distance between the moveable capacitive plate and the fixed capacitive plate formed on the second substrate.

11. The capacitive device of claim 9, wherein the moveable capacitive plate is mechanically coupled to the at least one actuator structure using a non-conductive connective structure.

12. The capacitive device of claim 11, wherein the non-conductive connective structure comprises at least one support tab.

13. A capacitive device comprising:
a first actuator structure formed on a first substrate, wherein the first actuator structure comprises a piezoelectric actuator structure and an electrostatic actuator structure;
a second actuator structure formed on the first substrate, wherein the second actuator structure comprises a piezoelectric actuator structure and an electrostatic actuator structure; and
a moveable structure formed on the first substrate and mechanically coupled to both the first actuator structure and the second actuator structure, the moveable structure comprising:
a moveable capacitive plate formed using a conductive material only, wherein a capacitance is formed between the moveable capacitive plate and a fixed capacitive plate formed on a second substrate; and
a bridge, substantially planar to the moveable capacitive plate, formed using the conductive material only, wherein the bridge is used to mechanically and electrically couple the moveable capacitive plate to a signal line formed on the first substrate such that the moveable capacitive plate moves up or down based on forces generated by the first actuator structure and the second actuator structure.

14. The capacitive device of claim 13, wherein the capacitance formed between the moveable capacitive plate and the fixed capacitive plate formed on the second substrate is a function of a distance between the moveable capacitive plate and the fixed capacitive plate formed on the second substrate.

15. The capacitive device of claim 13, wherein the moveable capacitive plate is mechanically coupled to the first actuator structure using a first non- conductive connective structure and wherein the moveable capacitive plate is coupled to the second actuator structure using a second non-conductive connective structure.

16. The capacitive device of claim 15, wherein the first non-conductive connective structure comprises at least one support tab and wherein the second non-conductive connective structure comprises at least one support tab.

17. The capacitive device of claim 13, wherein the moveable structure is electrically isolated from both the first actuator structure and the second actuator structure.

* * * * *